UNITED STATES PATENT OFFICE 2,509,233

EMULSIFIABLE OIL CONCENTRATES OF BIOLOGICAL TOXICANTS

Russell A. Kaberg, St. Louis, and John S. Harris, Richmond Heights, Mo., assignors to Monsanto Chemical Company, St. Louis, Mo., a corporation of Delaware No Drawing. Application September 11, 1946, Serial No. 696,342

8 Claims. (Cl. 167—43)

This invention relates to new and improved oil compositions which may be added to water to form permanent oil-in-water emulsions. These new oil compositions are further characterized by the fact that they will form oil-in-water emulsions without vigorous or prolonged agitation. The oils used in making these emulsions may contain various active ingredients dissolved therein, such as oil-soluble insecticides, plant hormones, fungicides, herbicides and the like. As a group, these active ingredients may be referred to as biological toxicants.

More particularly, our invention pertains to a combination of two different types of surface-active agents which are dissolved in the oil for the purpose of making the oil easy to emulsify in water. In fact, these new compositions may be referred to as concentrates and, when insecticides, fungicides, herbicides, plant hormones and the like are dissolved in the oil concentrate, it serves as a useful means of preparing oil-in-water emulsions for spraying, painting, or otherwise applying.

When our invention is used to make oil-in-water emulsions adapted for use as agricultural sprays, the active ingredient or biological toxicant is dissolved in the oil along with the combination of surface-active agents. This mixture is then added to water and a permanent emulsion is obtained quickly and without agitation. Likewise, when oil-in-water emulsions are desired for use as cutting oils, the agent which imparts improved cutting properties, such as tricresyl phosphate or sulfurized oils, is first dissolved in oil along with the mixture of surface-active agents and then the composition is added to water for the formation of oil-in-water emulsions.

Oil-in-water emulsions have been used before in many arts and various emulsifying agents have been used for the purpose of forming such emulsions. One feature of our invention resides in the discovery that a mixture of two types of surface-active agents gives a more stable oil-in-water emulsion than either of the surface-active agents when used alone, and in addition, these oil-in-water emulsions form quickly and substantially without the aid of agitation. In fact, the oil-in-water emulsions are formed from the concentrate by a process of self-dispersion.

Our emulsifiable concentrate or improved oil composition may, in its broad aspects, consist of the following ingredients by weight: oil 20 to 90%; auxiliary solvents such as pine oil, water, methylene chloride or mixtures thereof 0 to 25%, but when water is used, amounts up to only 10% are preferred; sulfonated or sulfated surface-active agent 3 to 10%; polyglycol ethers 3 to 10%; and addition agents, such as insecticide, fungicide, herbicide, addition agents for lubricants and the like, 4 to 60%. The particular use to be made of the oil concentrate will determine the range of ingredients to use and the examples set forth hereinafter will illustrate several modifications of our invention.

The term "oil" or "aromatic oil," as used in our invention, is limited to hydrocarbon liquids which boil within the range of 176° F. and 760° F. and are aromatic in nature or contain at least 15% of aromatic hydrocarbons boiling within the range of 176° F. and 760° F. One of the essential features of our invention resides in the use of oils or aromatic oils, as described above, in connection with two different types of surface-active agents, as hereinafter described. Typical examples of these hydrocarbon oils are benzene, toluene, xylene, monomethyl naphthalenes, dimethyl naphthalenes, trimethyl naphthalenes, tetramethyl naphthalenes, ethyl naphthalenes, pine oil and mixtures of oils containing these aromatic hydrocarbons. Likewise, petroleum fractions boiling within the above range which are aromatic in nature, containing at least 15% (and preferably 20%) aromatic hydrocarbons, may also be used, and the preferred source of these oils is from recycle stocks which have been cracked with the aid of catalyst, such as those containing silica and alumina. The preferred boiling range of the oils used in our invention is between 176 and 570° F. Illustrative examples of petroleum hydrocarbon fractions which may be used are as follows:

| | Oil A | Oil B | Oil C | Oil D |
|---|---|---|---|---|
| (1) API Gravity at 60° F. | 22.5 | 13.9 | 12.3 | 24.3 |
| (2) Initial Boiling Point °F. | 360 | 455 | 500 | 385 |
| (3) 50% Boiling Point °F. | 418 | 487 | 528 | 428 |
| (4) 90% Boiling Point °F. | 450 | 505 | 550 | 475 |
| (5) End Boiling Point °F. | 465 | 520 | 565 | 505 |

Another group of aromatic oils which have proven very effective in the making of our concentrates is as follows:

| | Oil E | Oil F | Oil G |
|---|---|---|---|
| (1) API Gravity at 60° F. | 11.5–13.5 | 10.5–12.5 | 3.5–8.5 |
| (2) Initial Boiling Point °F. | 440–450 | 480–495 | 520–540 |
| (3) 50% Boiling Point °F. | 480–490 | 520–535 | 610–630 |
| (4) 90% Boiling Point °F. | 500–510 | 540–555 | 690–710 |
| (5) End Boiling Point °F. | 515–520 | 550–565 | 700–725 |

Oil E is composed of at least 75 to 80% dimethyl naphthalenes, oil F contains at least 75 to 80% trimethyl naphthalenes and oil G contains at least 75 to 80% tetramethyl naphthalenes. These oils may be prepared by mixing the corresponding alkyl-substituted naphthalenes with other petroleum hydrocarbons, or they may be separated as cuts from hydrocarbon oil fractions high in alkyl-substituted naphthalenes.

The two surface-active agents used in our invention are selected from two different classes of organic compounds. One class of surface-active agents, for convenience referred to as class A, comprises the "oil" soluble organic sulfates or sulfonates having a Draves wetting time of 10.5 seconds or less in 0.5% aqueous solutions. This class of surface-active agents is usually called wetting agents. The method of determining this Draves wetting time or sinking time is described in the 1944 Yearbook of the American Association of Textile Chemists and Colorists, volume XXI, page 199. Examples within this class of surface-active agents are the alkali metal salt of a mono-, di- or tri-sulfonated aromatic hydrocarbon of the benzene series, such as benzene, toluene and xylene, wherein the aromatic nucleus also contains an aliphatic side chain containing from 10 to 18 (and preferably 10 to 14) carbon atoms. These agents may be represented by the general formula:

$$R-Ar-(SO_3X)_n$$

wherein Ar stands for an aromatic hydrocarbon radical of the benzene series, $n$ stands for a whole number such as 1, 2 or 3, X stands for an alkali-metal such as sodium or potassium, and R stands for an aliphatic hydrocarbon chain containing from 10 to 18 carbon atoms. Typical examples of these emulsifying agents are the alkali-metal salts of decyl-, dodecyl-, tetradecyl- or octadecyl-benzene sulfonic acid, as well as the corresponding di- or tri-sulfonated product. Also mixtures of these wetting agents may be used.

Additional examples of various types of sulfonated and sulfated wetting agents of class A are sulfo-succinic acid dialkyl esters, such as sodium dihexyl sulfo-succinate, sodium dioctyl sulfo-succinate, sodium didecyl sulfo-succinate, sodium didodecyl sulfo-succinate and the like; dialkyl-cyclohexylamine-dodecyl sulfate and similar products wherein the alkyl groups contain from 1 to 4 carbon atoms and the dodecyl group is replaced by alkyl groups containing from 10 to 18 carbon atoms such as dimethyl-cyclohexylamine-octadecyl sulfate, dibutyl-cyclohexylamine decyl sulfate and the like; alkylated biphenyl sodium mono-sulfonates such as monobutyl-, monoamyl- or mono-octylbiphenyl sodium mono-sulfonate; dialkylated phenyl phenol sodium disulfonates such as dibutyl phenyl phenol sodium disulfonate, diamyl phenyl phenol sodium disulfonate, dihexyl phenyl phenol sodium disulfonate; butyl naphthalene sodium monosulfonate, isopropyl naphthalene sodium monosulfonate, decyl or dodecyl sodium sulfate and the like. All of the foregoing products are sulfonates or sulfates, soluble in the oil used in making our herein described concentrate and are effective wetting agents as demonstrated by their ability to give a Draves wetting time of 10.5 seconds or less in an aqueous solution containing 0.5% by weight of the wetting agent.

The second class of surface-active and emulsifying agents, for convenience referred to herein as class B agents, consists of the water soluble, non-resinous reaction products of ethylene oxide and abietic acid or compositions containing abietic acid such as rosin, rosin oils and tall oils. It is understood that where abietic acid is used in the specification and claims, we may also use the ordinary abietic acids normally occurring in rosin or colophony, for example, abietic acid, abietic anhydride, also, Steel's abietic acid, abietic acid isomers such as l-pimaric acid and d-pimaric acid and also the tall oil resin acids and rosin oil resin acids, and mixtures of abietic acid and abietic acid containing compositions.

In general, this class of surface-active agents may be prepared by reacting abietic acid or compositions containing the same, with ethylene oxide in an amount such, that at least 0.5 part up to 4 to 5 parts by weight of ethylene oxide per part of abietic acid are condensed. The reaction may be carried out at any temperature above the melting point of the abietic acid containing material. Usually a temperature above 130° C., but below 190° C., is suitable. Generally, when any composition containing abietic acid is condensed with at least 0.5 part and up to 1.4 parts by weight of ethylene oxide per part of rosin or abietic acid, a considerable portion thereof becomes water soluble and surface active. When greater amounts of ethylene oxide are condensed with the abietic acid containing composition, the product becomes more readily and completely water-soluble. Therefore, it is desirable to use the compositions resulting from the condensation of abietic acid containing compositions and 1.4 to 5 parts by weight of ethylene oxide per part of abietic acid.

Ordinary rosin or colophony contains abietic acid or abietic anhydride in substantial amounts. Also present may be l-pimaric and d-pimaric acid. The form of abietic acid occurring in ordinary rosin may, upon treatment with acetic acid or with alkalis, be converted into Steel's abietic acid. This particular acid is unstable and readily oxidizable. It may therefore, be subjected to a disproportionation treatment to yield a product containing rosin acids known as dehydroabietic acid and dihydroabietic acid. Surface-active agents of class B may be prepared by condensing at least 0.5 part but less than 5 parts by weight of ethylene oxide per part of rosin, Steel's abietic acid, resin acid, or any of the above described forms of abietic acid, although more desirable products are obtained by condensing rosin with at least 1.4 parts but less than 5 parts by weight of ethylene oxide per part of rosin or abietic acid, as in this latter range the condensation products are completely water soluble.

The rosin-ethylene oxide product is an oily liquid. As the ethylene oxide content of the product is increased, it becomes somewhat more viscous. However, there has been no observed tendency to become semi-solid or wax-like in the higher ranges, for example, when 4 to 5 parts of ethylene oxide per part of rosin or abietic acid are employed.

Rosin oils may be selected as the abietic acid containing compositions for condensation with ethylene oxide. Rosin oils consists of a mixture of abietic acid together with terpenes resulting from the decarboxylation of abietic acid by means of heat. The so-called neutral rosin oils and the commercial grade of rosin oil known as kidney oil, containing about 56% abietic acid has been found suitable for the condensation. Compositions comprising the condensation product of rosin oil or kidney oil with at least 0.5 part but less than 5 parts by weight of ethylene oxide per part of rosin oil, are readily soluble and satisfactory as a class B surface-active emulsifying agents.

The desirable properties possessed by the rosin acid-ethylene oxide condensation products are also possessed by the products resulting from the condensation of mixtures of abietic acid and fatty acids such as oleic acid, linoleic acid or linolenic acid with ethylene oxide. Tall oil is such a rosin containing mixture of fatty acids such as oleic, linoleic or linolenic acids. Tall oil by reason of the treatment of the original wood with alkali, contains abietic acid in the form of Steele's abietic acid. The reaction products of tall oil with at least 0.5 part by weight of ethylene oxide per part of tall oil possess excellent wetting and emulsifying properties.

Tall oil is obtained as a by-product in large quantities in the paper industry, wherein paper pulp is produced by the sulfate process; the major constituents of the oil comprise rosin acids, fatty acids and certain non-acid constituents, chiefly sterols and the like. The composition of tall oil is somewhat variable; however, it usually has a composition within the following limits:

|  | Per cent |
|---|---|
| Fatty acids | 30–45 |
| Rosin acids | 50–55 |
| Non-acids | 8–10 |

In some cases the rosin acids or abietic acid may be crystallized or separated out of the tall oil and a fraction consisting largely of Steele's abietic acid containing smaller amounts of fatty acids than normally present in tall oil obtained. Such a fraction may contain from 0.5% up to 15% or 28% of free fatty acids, the balance being abietic acid and the fraction as such may be employed for the production of the herein described wetting and emulsifying product.

The physical properties of the condensation products produced from tall oil or rosin depend upon the amount of ethylene oxide combined therewith. The tail oil-ethylene oxide product at room temperature is a readily flowing, sticky oil in the lower ranges of combined ethylene oxide, becoming more viscous as the amount of ethylene oxide is increased and finally reaching a consistency equivalent to that of a soft wax as the combined ethylene oxide reaches two parts per part of tall oil.

Although these condensation products between ethylene oxide and rosin acids may be prepared by several methods, the following examples will serve to illustrate the preparation of these class B products.

Example I 100 grams of N-grade rosin was melted and then heated to a temperature between 150° C. and 160° C., 0.25 gram KOH was added and ethylene oxide gas passed into the molten rosin by means of a gas distributor until 146 grams had been combined with the rosin. This corresponds to approximately 10 moles of ethylene oxide per mole of abietic acid. The product is very soluble in water, and is an efficient melting and emulsifying agent. When Steele's abietic acid is employed in place of N-grade rosin a somewhat similar product is obtained.

Example II 57.6 grams of rosin oil containing 56% of rosin acids, the oil constituting the commercial product known as "kidney oil," was heated to a temperature of about 145° C.; 0.25 gram of potassium hydroxide was then added and gaseous ethylene oxide was bubbled through the heated oil until 56.6 grams of ethylene oxide had been absorbed. This corresponds to 0.98 part of ethylene oxide per part rosin oil or 1.8 parts ethylene oxide per part rosin acid. The product is a perfectly water-soluble dark yellow oil, and is a satisfactory class B agent.

Example III 100 grams of crude tall oil was heated in an oil bath to a temperature of about 180° C., and 0.25 gram potassium hydroxide added. Gaseous ethylene oxide was passed into the tall oil until 200 grams of ethylene oxide had been absorbed. The product is a water soluble surface-active agent of class B as herein described.

The potassium hydroxide present in the examples is used as a catalyst. It is to be understood that the catalyst is not essential since the reaction can be caused to proceed, though at a slower rate, without the presence of a catalyst.

As pointed out hereinbefore, these emulsifiable oil concentrates may also carry various addition agents; for example, insecticides such as amyl benzyl cyclohexylamine; monochlorothonitrodiphenyl; ethylbenzol-cyclohexylamine; organic thiocyanates, such as B-butoxy, B'-thiocyanodiethyl ether, phenyl benzyl ether having a phenyl substituent containing a thiocyano group, bornyl and fenchyl thiocyanoacetate; alkyl ethers of pentachlorophenol, such as the propyl, butyl and amyl ethers of pentachlorophenol; 2,2-bis-(parachlorophenyl) - 1,1,1 - trichlorethane, 2,2 - bis- (parafluorophenyl) - 1,1,1 - trichlorethane; nicotine; pyrethrum and the like. The foregoing cyclohexylamine derivatives may be referred to generically by the following formula:

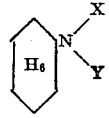

wherein X represents an alkyl group containing from 2 to 8 carbon atoms, such as the ethyl, butyl, amyl, hexyl and octyl radicals, and Y is a benzyl or benzoyl group.

The class of insecticides illustrated by the above-mentioned trichlorethane compound may be illustrated by the following formula:

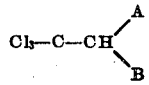

wherein A and B represent monovalent radicals selected from the group consisting of aliphatic, araliphatic and aromatic radicals of the benzene series. Examples of such radicals are ethyl, propyl, butyl, amyl, phenyl, fluorophenyl, chlorophenyl, methoxyphenyl, ethoxyphenyl, benzyl and the like. The radicals A and B may be the same or different radicals, for example, A may be a phenyl radical and B a chloro- or fluorophenyl radical. Mixtures of the foregoing insecticides may also be used, for example, a mixture of monochlor-orthonitrobiphenyl and 2,2-bis - (parachlorophenyl)-1,1,1-trichlorethane in which the biphenyl derivative is used in the ratio of 2 or 3 parts to 1 part by weight of the trichlorethane derivative.

Examples of herbicides that may be added to the oil concentrates are pentachlorophenol, orthodichlorobenzene, phenoxy acetic acid, halogenated phenoxy acetic acid, such as 2,4-dichlorphenoxy acetic acid and the alkyl esters of phenyl carbamic acid such as ethyl, isopropyl and butyl esters of phenyl carbamate.

When the above insecticides, fungicides, erbicides and the like are added to the oil concentrate, it is sometimes desirable to add an auxiliary solvent which increases their solubility in the oil. Small amounts of water, pine oil, brown camphor oil, methylene chloride and the like are suitable for this purpose. The amount of water used should not exceed 10%, but the other auxiliary solvents may be used in amounts up to 25% by weight.

The examples below illustrate some of the specific embodiments of our invention.

*Example I*

An emulsifiable concentrate was prepared by mixing the following:

|   | Per cent |
|---|---|
| (1) Hydrocarbon oil—Boiling substantially between 450 and 520° F., and composed primarily of aromatic hydrocarbons | 90 |
| (2) Dodecyl benzene sodium monosulfonate | 5 |
| (3) Condensation product of 1 part tall oil and between 1.9 to 2.1 parts of ethylene oxide | 5 |

This concentrate may be added to water in almost any proportion desired for the formation of a permanent oil-in-water emulsion. Likewise, various oil-soluble materials, such as insecticides, fungicides, herbicides and the like may be added to the oil, in the above concentrate, and then when such concentrates are added to water, the permanent oil-in-water emulsion may be used as an insecticide, fungicide and the like.

*Example II*

An emulsifiable concentrate was prepared by mixing the following:

|   | Per cent |
|---|---|
| (1) Oil—Boiling substantially between 440 and 520° F. and composed primarily of dimethyl naphthalenes and a small amount of naphthalene hydrocarbons | 60 |
| (2) Auxiliary—Water | 5 |
| (3) Insecticide, such as amyl benzyl cyclohexylamine or 2,2-bis-(parachlorophenyl)-1,1,1-trichlorethane or mixtures of these two materials | 25 |
| (4) Alkyl-substituted benzene sodium monosulfonate wherein the alkyl chain contains from 10 to 14 carbon atoms | 5 |
| (5) Condensation product of 1.4 parts by weight of ethylene oxide and 1 part of abietic acid | 5 |

This concentrate may be mixed with water in a great variety of proportions for the formation of an oil-in-water emulsion containing from 1 to 10% of the insecticide material. One part of the above concentrate in 4 parts of water will give a permanent oil-in-water emulsion containing 5% of the insecticide. Likewise, when 1 part of the concentrate is mixed with 24 parts of water, the resulting oil-in-water emulsion will contain 1% of the insecticide. We have made concentrates, as described above, and then added them to water to form oil-in-water emulsions containing in combination as little as .1% to .5% amyl benzyl cyclohexylamine and .04 to .1% of 2,2-bis-(parachlorophenyl)-1,1,1-trichlorethane and used in greenhouses to combat mites and other plant pests.

In the above formulation of the concentrate, the alkyl-substituted benzene sodium monosulfonate and the condensation product containing ethylene oxide (polyglycol ether of rosin acids) may vary from 3% to 10% by weight, but as a rule, 5% of each is sufficient. The small amount of water in the concentrate serves as an auxiliary solvent to give a quick break and assists with the formation of a clear solution and this may vary from 0 to about 10%. Other auxiliary solvents, such as pine oil, methylene chloride and the like, may be added to the concentrate to assist with the formation of clear solutions.

*Example III*

An emulsifiable concentrate was prepared by mixing the following:

|   | Per cent |
|---|---|
| (1) Oil—Boiling between 450 and 530° F. and comprising essentially polyalkyl naphthalenes and napthene hydrocarbons | 25 |
| (2) Amyl benzyl cyclohexylamine (insecticide) | 50 |
| (3) Pine oil | 15 |
| (4) Alkyl-substituted benzene sodium monosulfonate wherein the alkyl group contains from 10 to 12 carbon atoms | 5 |
| (5) Condensation product of 21.0 parts by weight of ethylene oxide with 1 part of kidney oil (rosin oil containing 56% abietic acid) | 5 |

This concentrate was then diluted with water to form an oil-in-water emulsion containing about .3% by weight of the amyl benzyl cyclohexylamine. This oil-in-water emulsion is stable and formed without agitation. This emulsion has proven to be very effective against the control of red spider on vegetation.

In the foregoing concentrate, we have found it convenient to prepare variations wherein the oil content ranges from 20 to 70%, the pine oil or other auxiliary solvent may vary from 0 to 20%, the amyl benzene cyclohexylamine, an oily liquid product may vary from 10 to 60% and each of the surface-active agents may vary from 3 to 10%. In formulations of this type we are able to use small amounts of oil because the amyl benzene cyclohexylamine is liquid. As indicated hereinbefore, these concentrates may be added to water to form oil-in-water emulsions containing varying amounts of the insecticide, for example, from 0.05 to 1%.

*Example IV*

An emulsifiable concentrate was prepared by mixing the following:

|   | Per cent |
|---|---|
| (1) Oil—Xylene or a mixture of xylene and 20% pine oil | 87.5 |
| (2) Herbicide or plant hormone (2,4-dichlorphenoxy acetic acid) | 5.0 |
| (3) Alkyl benzene sodium monosulfonate wherein the alkyl group contains from 10 to 14 carbon atoms | 5.0 |
| (4) Condensation product of 1.46 parts by weight of ethylene oxide with 1 part of N-grade rosin | 2.5 |

When the above concentrate is added to 50 parts of water a permanent oil-in-water emulsion is formed without agitation and this has proved very effective as a herbicide against broad leaf weeds. When the above concentrate is diluted with 5000 parts of water to form an oil-in-water emulsion, it has proven effective as a plant stimulant or hormone.

Example V

An emulsifiable concentrate was prepared by mixing the following:

|     | | Per cent |
| --- | --- | --- |
| (1) | Oil—Distilling between 450 and 520° F. and comprising at least 60% dimethyl naphthalenes and the remainder essentially naphthene hydrocarbons | 40 |
| (2) | Pine oil | 20 |
| (3) | Insecticide—2,2- bis-(parachlorophenyl) - 1,1,1-trichlorethane | 25 |
| (4) | Dodecyl benzene sodium monosulfonate | 5 |
| (5) | Condensation product of N-grade rosin and 4.8 to 5.0 parts of ethylene oxide per part of rosin | 5 |

This concentrate was then added to water to form an oil-in-water emulsion containing any desired amount of the insecticide, for example, from 0.5 to 5% of the insecticide. In making the foregoing concentration, the amount of oil used may vary conveniently from 30 to 60%, the pine oil may vary from 5 to 30%, the insecticide may vary from 20 to 50% and each of the surface-active agents may vary from 3 to 10%. When these formulations are added to water to make an oil-in-water emulsion containing the insecticide in amounts ranging from 0.5 to 5%, the oil-in-water emulsion or spray may be used very effectively to combat flies, mosquitoes, Colorado potato beetles and the various insects that attack agricultural crops. Concentrates for making oil-in-water emulsions for use as a spray against mites can be prepared according to Example V or according to the modifications set forth above by substituting the trichlorethane derivative with amyl benzyl cyclohexylamine or a 3-to-1 mixture of monochlor-orthonitrobiphenyl and 2,2-bis-(parachlorophenyl) - 1,1,1- trichlorethane. Furthermore, the oil-in-water emulsion may be prepared by pouring the concentrate into the desired amount of water and the emulsion will form without any agitation and will remain stable for long periods of time without showing any tendency to separate.

As indicated hereinbefore, instead of using one biocide in our emulsifiable oils, we may add two or more materials and the amounts used may be chosen so that when the concentrates are added to water the resulting oil-in-water emulsion will contain the desired concentrate of active substituents.

When attempts were made to prepare dispersible oil concentrates by using only one of the herein described surface-active agents, the results were highly unsatisfactory or complete failures. For example, when 90 parts by weight of xylene was mixed with 10 parts by weight of the condensation product of 1 part by weight of N-grade rosin and 1.46 parts by weight of ethylene oxide, and then added to water, practically no dispersion or oil-in-water emulsion was formed. However, when 90 parts by weight of xylene were mixed with 5 parts by weight of the above condensation product and 5 parts by weight of dodecyl benzene sodium monosulfonate and then the solution added to water, an excellent oil-in-water emulsion was formed without agitation and the oil remained dispersed for several weeks without showing any tendency to separate. Likewise when 90 parts by weight of an oil boiling within the range of 450 to 530° F. and comprising at least 75% dimethyl naphthalenes was mixed with 10 parts by weight of the condensation product of 1 part by weight of rosin oil and 1 part by weight of ethylene oxide, the resulting solution was then added to water. Instead of forming a milky oil-in-water emulsion, most of the oil was dispersed in large particles which soon collected on top of the water. However, when 90 parts of this oil was mixed with 5 parts of the same ethylene oxide condensation product and 5 parts by weight of sodium dioctyl sulfosuccinate, and then the oil concentrate added to water, an excellent oil-in-water emulsion formed without agitation and which was permanent. When the foregoing pair of comparative tests were repeated with mixtures of the oil and various insecticides, herbicides and the like—oil contents ranging from 20 to 0%—the same results were obtained. In each case the two surface-active agents were greatly superior to either of them alone.

We claim:

1. A water-dispersible concentrate for forming stable oil-in-water emulsions comprising an aromatic oil boiling within the range of 176 to 570° F.; a biological toxicant soluble in said aromatic oil; from 3 to 10% by weight of an oil-soluble organic surface-active agent which is a neutral salt and which is selected from the group consisting of sulfonates and sulfates and having a Draves wetting time of less than 10.5 seconds in an aqueous solution consisting of 0.5% by weight of said surface-active agent; and from 3 to 10% by weight of the non-resinous condensation product of 1 part of a substance selected from the group consisting of abietic acid, abietic anhydride, isomers of abietic acid, salts of abietic acid, esters of abietic acid, resin acids, rosin, rosin oil and tall oil, with at least 0.5 part and less than 5 parts by weight of ethylene oxide.

2. A water-dispersible concentrate for forming stable oil-in-water emulsions comprising an aromatic oil boiling within the range of 176 to 570° F.; a biological toxicant soluble in said aromatic oil; from 3 to 10% by weight of an oil-soluble organic surface-active agent which is a neutral salt and which is selected from the group consisting of sulfonates and sulfates and having a Draves wetting time of less than 10.5 seconds in an aqueous solution consisting of 0.5% by weight of said surface-active agent; and from 3 to 10% by weight of the non-resinous condensation product of 1 part of a substance selected from the group consisting of abietic acid, abietic anhydride, isomers of abietic acid, salts of abietic acid, esters of abietic acid, resin acids, rosin, rosin oil and tall oil, with at least 1.4 parts and less than 4 parts by weight of ethylene oxide.

3. A water-dispersible concentrate for forming stable oil-in-water emulsions comprising an aromatic oil boiling within the range of 176 to 570° F.; a biological toxicant soluble in said aromatic oil; from 3 to 10% by weight of an oil-soluble organic surface-active agent which is a neutral salt and which is selected from the group consisting of sulfonates and sulfates and having a Draves wetting time of less than 10.5 seconds in an aqueous solution consisting of 0.5% by weight of said surface-active agent; and from 3 to 10% by weight of the non-resinous condensation product of 1 part of tall oil with at least 1.4 parts and less than 4 parts by weight of ethylene oxide.

4. A water-dispersible concentrate for forming stable oil-in-water emulsions comprising an aromatic oil boiling within the range of 176 to 570° F.; an insecticide soluble in said aromatic oil; from 3 to 10% by weight of an oil-soluble organic surface-active agent which is a neutral salt and which is selected from the group consisting of sulfonates and sulfates and having a Draves wetting time of less than 10.5 seconds in an aqueous solution consisting of 0.5% by weight of said surface-active agent; and from 3 to 10% by weight of the non-resinous condensation product of 1 part of abietic acid and at least 0.5 part and less than 5 parts by weight of ethylene oxide.

5. A water-dispersible concentrate for forming stable oil-in-water emulsions comprising an aromatic oil boiling within the range of 176 to 570° F.; an insecticide soluble in said aromatic oil; from 3 to 10% by weight of an oil-soluble organic surface-active agent which is a neutral salt and which is selected from the group consisting of sulfonates and sulfates and having a Draves wetting time of less than 10.5 seconds in an aqueous solution consisting of 0.5% by weight of said surface-active agent; and from 3 to 10% by weight of the non-resinous condensation product of 1 part of tall oil with at least 0.5 part and less than 5 parts by weight of ethylene oxide.

6. A water-dispersible concentrate for forming stable oil-in-water emulsions comprising an aromatic oil boiling within the range of 176 to 570° F.; a herbicide which is soluble in said aromatic oil; from 3 to 10% by weight of an oil-soluble organic surface-active agent which is a neutral salt and which is selected from the group consisting of sulfonates and sulfates and having a Draves wetting time of less than 10.5 seconds in an aqueous solution consisting of 0.5% by weight of said surface-active agent; and from 3 to 10% by weight of the non-resinous condensation product of 1 part of abietic acid and at least 0.5 part and less than 5 parts by weight of ethylene oxide.

7. A water-dispersible concentrate for forming stable oil-in-water emulsions comprising from 20 to 90% by weight of an aromatic oil boiling within the range of 176 to 570° F.; from 4 to 60% by weight of a biological toxicant soluble in said aromatic oil; from 3 to 10% by weight of an oil-soluble organic surface-active agent which is a neutral salt and which is selected from the group consisting of sulfonates and sulfates and having a Draves wetting time of less than 10.5 seconds in an aqueous solution consisting of 0.5% by weight of said surface-active agent; and from 3 to 10% by weight of the non-resinous condensation product of 1 part of a substance selected from the group consisting of abietic acid, abietic anhydride, isomers of abietic acid, salts of abietic acid, esters of abietic acid, resin acids, rosin, rosin oil and tall oil, with at least 0.5 part and less than 5 parts by weight of ethylene oxide.

8. A water-dispersible concentrate for forming stable oil-in-water emulsions comprising from 20 to 90% by weight of an aromatic oil boiling within the range of 176 to 570° F.; from 4 to 60% by weight of a biological toxicant soluble in said aromatic oil; from 3 to 10% by weight of an oil-soluble organic surface-active agent which is a neutral salt and which is selected from the group consisting of sulfonates and sulfates and having a Draves wetting time of less than 10.5 seconds in an aqueous solution consisting of 0.5% by weight of said surface-active agent; and from 3 to 10% by weight of the non-resinous condensation product of 1 part of abietic acid and at least 0.5 part and less than 5 parts by weight of ethylene oxide.

RUSSELL A. KABERG.
JOHN S. HARRIS.

REFERENCES CITED

The following references are of record in the file of this patent:

UNITED STATES PATENTS

| Number | Name | Date |
|---|---|---|
| 1,970,578 | Schoeller et al. | Aug. 21, 1934 |
| 2,002,613 | Orthner et al. | May 28, 1935 |
| 2,133,480 | Schoeller et al. | Oct. 18, 1938 |
| 2,380,166 | Griffin | July 10, 1945 |

Certificate of Correction

Patent No. 2,509,233 — May 30, 1950

RUSSELL A. KABERG ET AL.

It is hereby certified that error appears in the printed specification of the above numbered patent requiring correction as follows:

Column 5, line 44, for the word "tail" read *tall*; column 10, line 15, for "0%" read *80%*;

and that the said Letters Patent should be read as corrected above, so that the same may conform to the record of the case in the Patent Office.

Signed and sealed this 28th day of November, A. D. 1950.

[SEAL]

THOMAS F. MURPHY,
*Assistant Commissioner of Patents.*